United States Patent [19]

Itou

[11] Patent Number: 4,869,698
[45] Date of Patent: Sep. 26, 1989

[54] METHOD OF MANUFACTURING A BULB

[75] Inventor: Hidenori Itou, Yokosuka, Japan

[73] Assignee: Kabushiki Kaisha Toshiba, Kawasaki, Japan

[21] Appl. No.: 147,870

[22] Filed: Jan. 25, 1988

[30] Foreign Application Priority Data

Jan. 29, 1987 [JP] Japan .................. 62-17196

[51] Int. Cl.$^4$ .......................... C03B 23/06; H01J 9/32
[52] U.S. Cl. ......................................... 445/22; 65/108
[58] Field of Search ................. 445/22; 65/108, 110, 65/276, 281

[56] References Cited

U.S. PATENT DOCUMENTS

| | | | |
|---|---|---|---|
| 1,301,714 | 4/1919 | Kueppers | 65/108 |
| 1,923,148 | 8/1933 | Hotchner | 65/108 |
| 3,155,477 | 11/1964 | Swarts | 65/110 |
| 3,597,182 | 8/1971 | Vinz | 65/110 |
| 4,433,994 | 2/1984 | Fujimura et al. | |
| 4,525,192 | 6/1985 | Booms | 65/110 |
| 4,540,373 | 9/1985 | Rothwell | 65/110 |

FOREIGN PATENT DOCUMENTS 57-37449 3/1982 Japan .

Primary Examiner—Kurt Rowan
Attorney, Agent, or Firm—Cushman, Darby & Cushman

[57] ABSTRACT

A curved tubular bulb having an oblong cross section is manufactured by preparing a straight glass tube having open end portions, curving the straight glass tube such that its axis exist on a plane surface and corresponds to a predetermined curve, and deforming the curved glass tube such that the glass tube has an oblong cross section whose major diameter extends on the plane surface.

12 Claims, 4 Drawing Sheets

METHOD OF MANUFACTURING A BULB

BACKGROUND OF THE INVENTION

The present invention relates to a method of manufacturing a curved tubular bulb and, more particularly, to a method of manufacturing a curved tubular bulb having a compressed cross section.

As a fluorescent lamp device having compatibility with an incandescent lamp, a fluorescent lamp device having a convoluted discharge path is used. An example of a fluorescent lamp device of this type is disclosed in U.S. patent application Ser. No. 912,126 filed Sept. 26, 1986. This fluorescent lamp device is a convoluted fluorescent lamp comprising a plurality of U-shaped tubular bulbs. The U-shaped tubular bulb has a compressed cross section. The bulb comprises a tube curved along a U-shaped curve existing in a plane and having an oblong cross section compressed in the direction normal to the plane. Since the bulb has such a cross-sectional shape, the relative surface area to the cross-sectional area of the bulb is increased, thereby improving the heat dissipation property of the fluorescent lamp. As a result, thermal degradation of a phosphor coating applied inside the fluorescent lamp is suppressed, thereby allowing an increase in the lamp input and hence light-emitting intensity. Further, such cross-sectional shape of the bulb makes good use of the light emitted therefrom.

According to the method described in this application, a U-shaped bulb is entirely molded from a glass tube by means of molding dies. A continuous wall is formed between straight portions of the U-shaped bulb. Since the continuous wall exists between straight portions of the bulb, it is difficult to uniformly heat the bulb, particularly end portions of the bulb. For this reason, electrode mounts and others cannot be reliably connected to the bulb, or end portions of the bulb. Therefore, the step of partially removing the continuous wall is essential.

Japanese Patent Disclosure (Kokai) No. 57-37449 discloses a spiral bulb for a mercury-vapor lamp having a compressed cross section. This bulb comprises a tube curved into a spiral in shape and having an oblong cross section compressed in the curved direction. That is, the bulb is curved in the direction of a minor diameter of the oblong section. In other words, this bulb for a mercury-vapor lamp is different in compressed direction than that of the U-shaped bulb for a fluorescent lamp.

This bulb for a mercury-vapor lamp can be manufactured by a conventional method which is known to those skilled in the art. That is to say, a heated straight glass tube is bent about a heated jig to form a spiral glass tube. With the tube bending, the tube is deformed to have a compressed cross-sectional shape. If the above mentioned U-shaped bulb for a fluorescent lamp is manufactured by such a method, a difference of curvatures between outermost and innermost surface of the curved glass tube becomes very large. For this reason, the wall thickness of the manufactured bulb locally varies, resulting in a very high percentage of defective products.

SUMMARY OF THE INVENTION

In view of these considerations, it is an object of the present invention to provide an improved method of manufacturing a curved bulb of the type as described above, in which the number of manufacturing steps and a percentage of defective products are reduced.

In order to achieve the above object, the present invention provides a method of manufacturing a tubular bulb comprising the step of preparing a straight glass tube having open end portions, the step of curving the straight glass tube such that an axis of the glass tube exists in a plane surface and corresponds to a predetermined curve, and the step of deforming the curved glass tube such that the glass tube has an oblong cross section whose major diameter extends on the plane surface.

In addition, the step of deforming includes the process of molding the curved glass tube into the bulb, and the process of molding comprises the step of heating and softening the curved glass tube, the step of positioning the heated/softened glass tube between a couple of opposing molding dies, each of the molding dies having a molding groove corresponding to the predetermined curve and the oblong cross section, and the step of clamping the glass tube by the molding dies to form the bulb.

BRIEF DESCRIPTION OF THE DRAWING

FIGS. 2 to 8 are schematic views of an embodiment of a method of manufacturing a curved bulb according to the present invention, in which FIGS. 2 to 5 are views for explaining manufacturing steps, FIG. 6 is a perspective view of a bulb manufactured by the method according to the present invention, FIG. 7 is a transverse sectional view taken along line I—I in FIG. 6, and FIG. 8 is a transverse sectional view taken along line II—II in FIG. 6;

DETAILED DESCRIPTION OF THE PREFERRED EMBODIMENTS

Figure 1:
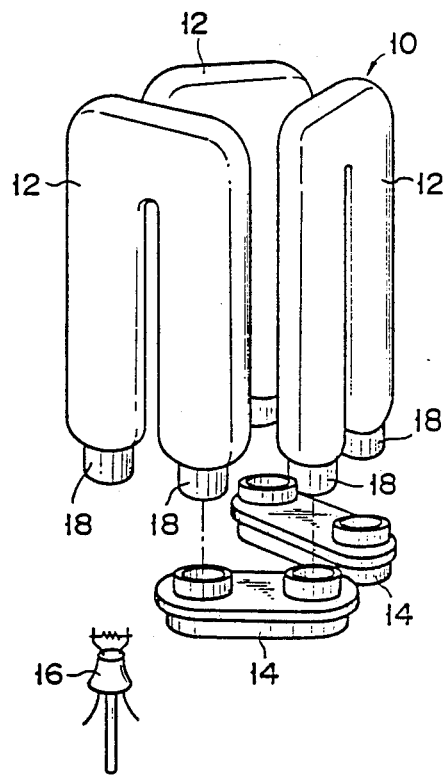
FIG. 1 is an exploded perspective view of a fluorescent lamp having a convoluted discharge path.

A fluorescent lamp having a convoluted discharge path is shown in FIG. 1. Fluorescent lamp 10 comprises U-shaped bulbs 12, connecting members 14, and electrode mounts 16. U-shape bulb 12 comprises a glass tube which is curved along a U-shaped curve existing in a plane and has an oblong transverse sectional shape having a major diameter extending in the plane.

Figure 2:
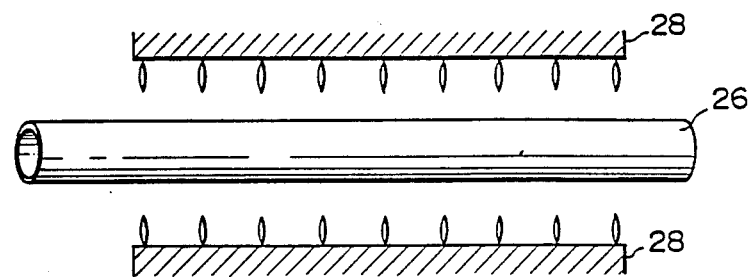
Figure 3:
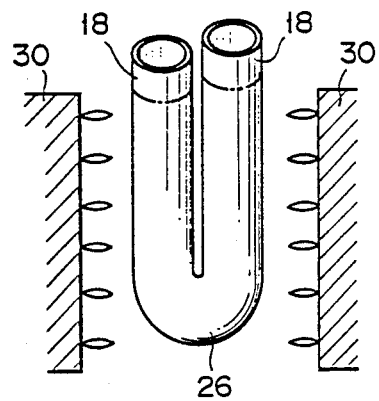
Figure 4:
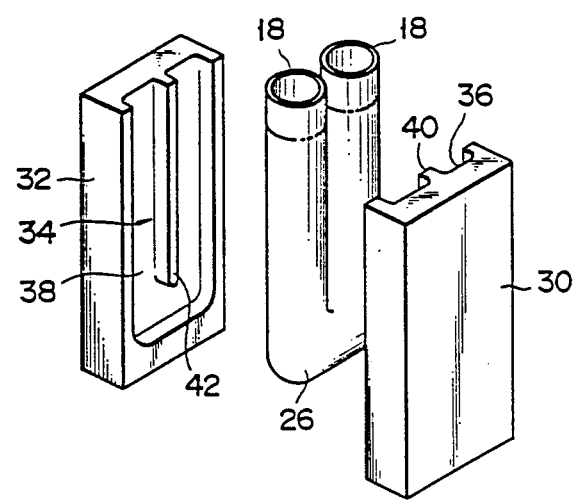
Figure 5:
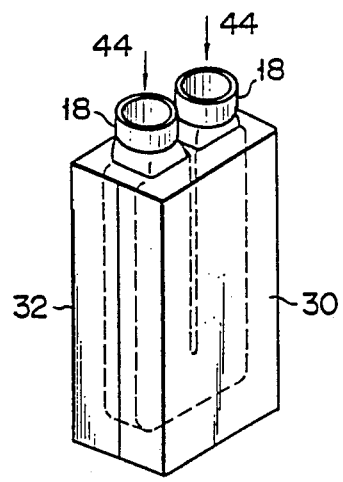

An improved method of manufacturing a bulb of the type as described above according to the present invention will be described below with reference to the accompanying drawings. First, as shown in FIG. 2, straight glass tube 26 having two open ends is prepared. Tube 26 has a ring-like cross section having an inner diameter corresponding to an outer diameter of electrode mount 16 to be mounted later and has a predetermined length corresponding to a developed length of curved bulb 12 to be formed. Tube 26 is heated up to a softening temperature and softened by heating means such as gas burner 28. Heated and softened tube 26 is curved at a central portion along its axial direction to be substantially U-shaped. In this case, since tube 26 is supported at both end portions 18, only the central portion of tube 26 to be curved is heated and softened. Tube 26 is curved so that its axis is substantially located in a plane and is substantially U-shaped. As a result, straight portions extending substantially parallel to each other and a coupling portion for coupling the straight portions are formed. As shown in FIGS. 3 and 4, substantially U-shaped tube 26 is supported and suspended at its end portions 18, and a portion except for end portions 18 is uniformly heated and softened by gas burner 30. Thereafter, as shown in FIGS. 4 and 5, only the heated/softened portion of tube 26 is clamped and molded by a couple of molding dies 30 and 32. In this molding process, a cross-sectional shape of U-shaped tube 26 is changed to a predetermined oblong cross-sectional shape.

A couple of molding dies used in this molding process includes male die 30 and female die 32. Dies 30 and 32 have a substantially symmetrical shape. With dies 30 and 32 engaged, cavity 34 substantially corresponding to an outer shape of substantially U-shaped bulb 12 is formed therebetween. Dies 30 and 32 have symmetrical molding surfaces 36 and 38 which define an outline of cavity 34. However, in the manufacturing method according to the present invention, not the entire tube but only a portion except for end portions 18 of tube 26 is molded as will be described later. Therefore, neither of dies 30 and 32 has a molding surface or a molding groove at a portion corresponding to end portions 18 of bulb 12. A length of an outline of a section of each of molding surfaces 36 and 38 in a direction perpendicular to the axis of bulb 12 is substantially the same as half that of an outer circumference of tube 26 before molding. In other words, cavity 34 of dies 30 and 32 is set such that a length of an outer circumference of a cross section of a compressed bulb to be molded substantially coincides with that of tube 26. Therefore, in the molding process according to the present invention, tube 26 is molded not to obtain a product having an entirely different shape but to deform its circular cross-sectional shape into a compressed one. A parting line of the molding dies, i.e., a dividing surface between dies 30 and 32 substantially coincides with a plane surface including the axis of bulb 12 to be molded. Therefore, an outline shape of a molding groove formed in each of dies 30 and 32 is a shape obtained by equally dividing an outline shape of cavity 34 at a plane surface including the parting line. It should be noted that projecting portions 40 and 42 respectively of dies 30 and 32 corresponding to a region between the straight portions of bulb 12 to be molded abut against each other when dies 30 and 32 are engaged.

In the molding process, tube 26 which is curved to be U-shaped prior to molding is clamped between molding surfaces 36 and 38 having the shapes as described above. In this case, as shown in FIG. 4, both end portions 18 of tube 26 which are not heated/softened project upward from dies 30 and 32 in a clamped state.

Figure 6:
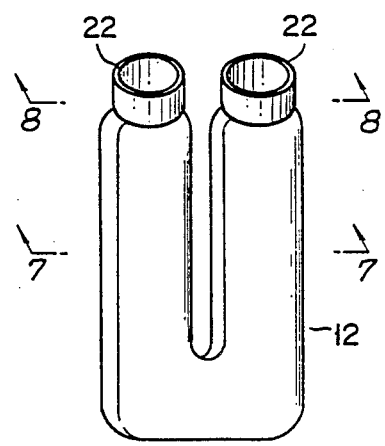
Figure 7:
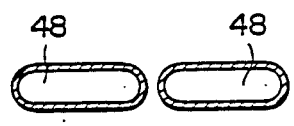
Figure 8:
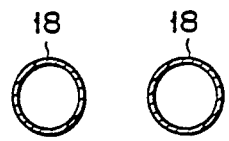

In this clamped state, pressurized air is blown into tube 26 as indicated by arrows 44 at open end portions 18 projecting from dies 30 and 32. By blowing the pressurized air into tube 26, the tube wall of tube 26 which is heated and softened is brought into tight contact with molding surfaces 36 and 38 respectively of dies 30 and 32. In this case, since end portions 18 of tube 26 are not heated/softened as described above, their sectional shapes are substantially not changed by this air blow. FIG. 6 shows a U-shaped glass tube molded in this manner, i.e., complete bulb 12. Bulb 12 has an oblong sectional shape corresponding to cavity 34 as shown in FIG. 7 at a portion clamped by a couple of molding dies 30 and 32. On the contrary, end portions 18 of tube 26 which are not molded still have an original circular sectional shape as shown in FIG. 8. U-shaped bulb 12 doesn't have a portion corresponding to the continuous wall between the straight portions.

U-shaped bulb 12 molded in this manner is picked up from dies 30 and 32 and then is preferably annealed by a heating furnace (not shown), thereby removing distortion produced by molding.

A phosphor coating is applied to the inner wall of bulb 12 thus formed. Predetermined number of bulbs 12 are coupled to each other at their adjacent end portions 18 by means of coupling members 14. Bulbs 12 are coupled to each other at their adjacent end portions 18 by means of coupling members 14, thereby forming a convoluted discharge path. Electrode mounts 16 are attached to end portions 18 which assume end portions of bulbs 12 and both ends of this discharge path. In this attaching process, electrode mounts 16 are sealed. An inert gas is then enclosed therein, thereby obtaining the fluorescent lamp having a convoluted discharge path.

In the bulb manufacturing method according to the present invention described above, after the curved glass tube is molded, no such steps for removing the above continuous wall and others are necessary at all. Therefore, in the bulb manufacturing method according to the present invention, the number of manufacturing steps can be reduced. In addition, since both end portions 18 of bulb 12 are substantially not heated in the improved manufacturing process, their cross-sectional shapes are not distorted. For this reason, electrode mount 16 or coupling members 14 are reliably connected to bulb 12, thereby reducing a percentage of defective products in bulb manufacture.

Figure 9:
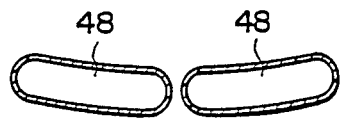
FIG. 9 is a sectional view of a modification of the bulb manufactured by the manufacturing method according to the present invention, in which a sectional shape corresponding to that in FIG. 7 is illustrated.

In the bulb manufacturing method according to the present invention, a sectional shape of discharge path 48 of bulb 12 can be modified by changing a cavity shape of molding dies. FIG. 9 shows a modification of a cross section of bulb 12 corresponding to a cross-sectional shape of path 48 shown in FIG. 7. According to the bulb shown in FIG. 9, an imaginary surface including a curved axis, i.e., a major diameter of a cross-sectional shape of discharge path 48 of bulb 12 is slightly curved.

Figure 10:
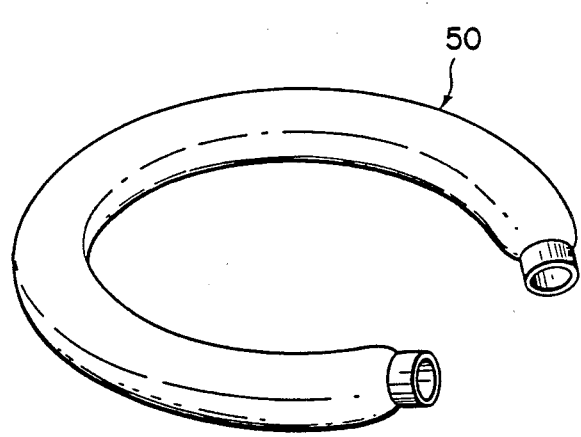
FIG. 10 is a perspective view of another modification of the bulb manufactured by the manufacturing method according to the present invention.

In the bulb manufacturing method according to the present invention, as long as the axis of the curved bulb is substantially included in the imaginary surface, particularly a plane surface, a bulb in which a curved shape of an axis is other than a U shape can be manufactured. FIG 10 shows bulb 50 which is manufactured by the improved method. As shown in FIG. 10, a curved shape of an axis of bulb 50 is substantially a circle.

What is claimed is:

1. A method of manufacturing a tubular bulb comprising the following steps in the sequence set forth:
   preparing a straight glass tube having open end portions;
   curving said straight glass tube such that an axis of said glass tube exists on an imaginary surface and corresponds to a predetermined curve; and
   deforming said curved glass tube such that said glass tube has a flattened cross section whose major diameter extends on said imaginary surface.

2. A method according to claim 1, wherein said curved glass tube is deformed except for said end portions.

3. A method according to claim 2, wherein the step of deforming includes the process of molding said curved glass tube into said bulb, the process of molding comprising:

the step of positioning said heated/softened glass tube between a couple of opposing molding dies, each of said molding dies having a molding surface corresponding to said bulb to be manufactured; and the step of clamping said glass tube by said couple of molding dies to mold said bulb.

4. A method according to claim 3, wherein the process of molding further comprises the step of injecting pressurized gas into said glass tube at said open end portions so as to bring said glass tube into tight contact with said molding surfaces of said molding dies.

5. A method according to claim 3, wherein said heated/softened glass tube is supported and suspended at said end portions.

6. A method according to claim 2, further comprising the step of cutting off said end portions.

7. A method according to claim 1, wherein said imaginary surface is a plane surface.

8. A method according to claim 7, wherein said straight glass tube is curved such that said end portions are adjacent to one another and its axis corresponds to a circular shape.

9. A method according to claim 7, wherein said straight glass tube is curved such that said end portions are adjacent to one another and its axis corresponds to a substantially U-shape.

10. A method according to claim 7, wherein the cross section of said curved glass tube is a compressed ring-like shape.

11. A method according to claim 1, wherein said imaginary surface is a part of a substantially cylindrical surface.

12. A method according to claim 11, wherein the cross section of said curved glass tube is oblong.

* * * * *